(12) United States Patent
Paniccia et al.

(10) Patent No.: US 11,656,080 B1
(45) Date of Patent: May 23, 2023

(54) SILICON NITRIDE WAVEGUIDE BASED INTEGRATED PHOTONICS FRONT-END CHIP FOR OPTICAL GYROSCOPE

(71) Applicant: Anello Photonics, Inc., Santa Clara, CA (US)

(72) Inventors: Mario Paniccia, Santa Clara, CA (US); Mike Horton, Santa Clara, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 0 days.

(21) Appl. No.: 17/894,108

(22) Filed: Aug. 23, 2022

(51) Int. Cl.
*G01C 19/72* (2006.01)

(52) U.S. Cl.
CPC .................................. *G01C 19/721* (2013.01)

(58) Field of Classification Search
CPC ............................ G01C 19/721; G01C 19/722
See application file for complete search history.

(56) References Cited

U.S. PATENT DOCUMENTS

| | | | |
|---|---|---|---|
| 5,054,923 A * | 10/1991 | Okada | ................... G01C 19/721 356/464 |
| 5,724,462 A | 3/1998 | Ido et al. | |
| 6,163,632 A | 12/2000 | Rickman et al. | |
| 6,259,089 B1 * | 7/2001 | Vali | ....................... G01C 19/722 356/465 |
| 10,731,988 B1 | 8/2020 | Paniccia et al. | |
| 10,969,548 B2 | 4/2021 | Paniccia et al. | |
| 2002/0015154 A1 | 2/2002 | Goldner et al. | |
| 2006/0029348 A1 * | 2/2006 | Kempen | ............... G02B 6/1228 385/129 |
| 2008/0079947 A1 | 4/2008 | Sanders et al. | |
| 2010/0098424 A1 | 4/2010 | Ho et al. | |
| 2017/0199037 A1 | 7/2017 | Jain | |
| 2018/0079947 A1 | 3/2018 | Contreras | |
| 2018/0259337 A1 | 9/2018 | Wang | |
| 2018/0358772 A1 * | 12/2018 | Puckett | ................. H01S 3/1305 |
| 2019/0101392 A1 | 4/2019 | Bischel et al. | |
| 2020/0064609 A1 | 2/2020 | Krampert et al. | |
| 2020/0116489 A1 | 4/2020 | Wang et al. | |

(Continued)

OTHER PUBLICATIONS

Hao Tian et al., "Hybrid integrated photonics using bulk acoustic resonators", Nature Communications, https://doi.Urg/10.1038/s41467-020-16812-6, 2020, pp. 1-8.

(Continued)

*Primary Examiner* — Michael A Lyons
(74) *Attorney, Agent, or Firm* — Lowenstein Sandler LLP; Madhumita Datta

(57) ABSTRACT

An integrated photonics optical gyroscope fabricated on a silicon nitride (SiN) waveguide platform comprises (SiN) waveguide-based optical components that constitute a front-end chip to launch light into and receive light from the rotation sensing element, that can be a fiber spool. The SiN waveguide-based components can be distributed between multiple layers that are stacked together to have a multi-layer configuration vertically and evanescently coupled with each other. External elements (e.g., laser, detectors, phase shifter) may be made of different material platform than SiN and can be hybridly integrated or otherwise coupled to the SiN waveguide platform. The phase shifters can be made of electro-optic material, or piezo-electric material or can be thermal phase shifters.

28 Claims, 7 Drawing Sheets

(56) References Cited

U.S. PATENT DOCUMENTS

2021/0072026 A1* 3/2021 Puckett ............... G01C 19/723
2021/0140768 A1 5/2021 Paniccia

OTHER PUBLICATIONS

PCT International Search Report and Written Opinion for International Application No. PCT/US2020/060289 dated Feb. 3, 2021, 20 pages.

* cited by examiner

SILICON NITRIDE WAVEGUIDE BASED INTEGRATED PHOTONICS FRONT-END CHIP FOR OPTICAL GYROSCOPE

TECHNICAL FIELD

The present disclosure relates to system-level integration of a fiber-optic sensing coil of an optical gyroscope with integrated photonics front-end chip fabricated on silicon nitride waveguide platform.

BACKGROUND

Gyroscopes (sometimes also referred to as "gyros") are devices that are able to sense angular velocity. Gyroscopes can be mechanical or optical, and vary in precision, performance cost and size. The applications include, but are not limited to, military, aircraft navigation, robotics, autonomous vehicles, virtual reality, augmented reality, gaming etc. Optical gyroscopes typically have the highest performance and are based on interferometric measurements and the Sagnac effect (a phenomenon encountered in interferometry that is elicited by rotation). Since optical gyroscopes do not have any moving parts, they have advantages over mechanical gyroscopes as they can withstand effects of shock, vibration and temperature variation better than the mechanical gyroscopes with moving parts. The most common optical gyroscope is the fiber optical gyroscope (FOG). Construction of a FOG typically involves a coil comprising several loops/turns of polarization-maintaining (PM) fiber. Laser light is launched into both ends of the PM fiber coil traveling in opposite directions. If the fiber coil is moving, the optical beams traveling in opposite directions experience different optical path lengths with respect to each other. By setting up an interferometric system, one can measure the small path length difference that is proportional to the area of the enclosed loop and the angular velocity of the rotating fiber coil.

Phase signal of an optical gyro is proportional to the Sagnac effect times the angular rotation velocity, as shown in the following equation:

$$\Delta\phi = (8\pi NA/\lambda c)\Omega$$

where, N=number of turns in the gyro; A=area enclosed; $\Omega$=angular rotation velocity; $\Delta\phi$=optical phase difference signal; $\lambda$=wavelength of light; and c=speed of light.

These FOGs can have very high precision, but at the same time, they are of large dimension, and are hard to assemble due to the devices being built based on discrete optical components that need to be aligned precisely, resulting in a more expensive gyroscope module. Often, manual alignment is involved, and fiber splicing is required, which is hard to scale up for volume production. This application discloses a compact integrated photonics front-end chip made on a silicon nitride (SiN) platform to launch light into a fiber-optic coil.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, an optical gyroscope utilizing a silicon nitride (SiN) waveguide platform is disclosed, where the gyroscope comprises: a rotation sensing element (e.g., a fiber coil); and a front-end chip fabricated on a SiN platform to launch light into and receive light from the rotation sensing element. Some optical elements, such as lasers, photodetectors and phase shifters are fabricated using a material platform other than the SiN waveguide platform.

The phase shifter, made of a material other than SiN, is hybridly integrated or otherwise coupled to the front-end chip. For example, the phase shifter can be fabricated by depositing metal or ceramic/polymer materials having electro-optic and/or piezoelectric properties on the front-end chip. Alternatively, the phase shifter can be fabricated by growing, wafer-bonding or attaching III-V compound semiconductor material on the front-end chip. Depending on the non-SiN material chosen, phase shifting can be thermal (using metallic heaters) or electro-optic or piezo-electric.

In some embodiments, the phase shifter is evanescently coupled to the SiN front-end chip coupled to the rotation sensing element.

In some embodiments, a common substrate with the light source (such as semiconductor lasers, including quantum dot lasers) and the detectors can be flip-chip bonded or wafer-bonded to the SiN waveguide platform.

In some other embodiment, the common substrate can be butt-coupled or coupled via a lens to the front-end chip with the input waveguides aligned to the light source and the detectors.

The phase shifters and the light sources and the detectors can be all fabricated on a separate layer that is hybridly integrated or otherwise coupled (such as discrete devices that are fiber-coupled) with the SiN waveguide platform.

The light sources can also be hybridly integrated with the SiN platform by selectively growing III-V materials. Similarly, photodetectors can also be hybridly integrated by selectively depositing or growing photodetector materials (e.g., germanium or silicon germanium or other compound semiconductors).

In another embodiment, the phase shifter is external to the SiN front-end chip and coupled directly to the fiber-optic sensing coil or coupled to the output waveguide branches of the SiN front-end chip.

BRIEF DESCRIPTION OF THE DRAWINGS

The present disclosure will be understood more fully from the detailed description given below and from the accompanying drawings of various implementations of the disclosure. Please note that the dimensions shown in the figures are for illustrative purposes only and not drawn to scale.

FIG. 5A also shows external phase shifters coupled to the integrated photonics front-end chip.

DETAILED DESCRIPTION

Aspects of the present disclosure are directed to integration of compact ultra-low loss silicon nitride waveguide based angular rotation sensing component with other system-level integrated photonics components for optical gyroscope applications. The system integration is done with large scale manufacturing in mind to facilitate mass production of integrated photonics optical gyroscopes.

Figure 1:
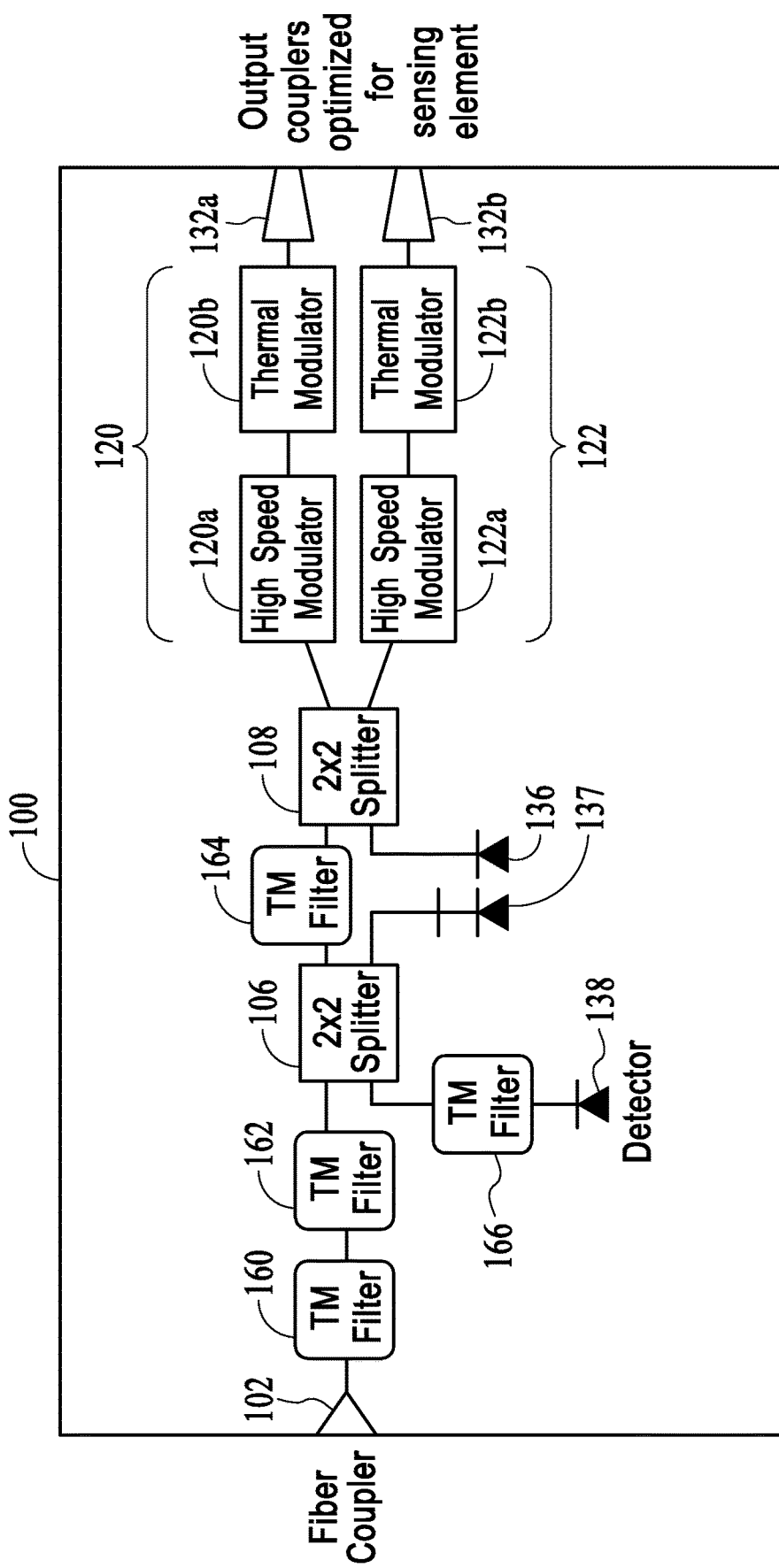
FIG. 1 is a schematic of an integrated photonics front-end chip that couples to a rotation sensing element, according to an embodiment of the present disclosure.

Integrated optical gyroscopes may have a front-end chip made of integrated photonics components that can launch and receive light from a rotation sensing element. The rotation sensing element of the optical gyroscope can comprise a fiber loop or another integrated photonics waveguide chip (e.g, a silicon nitride waveguide-based coil or microresonator ring). FIG. 1 is a schematic of one embodiment of an integrated photonics front-end chip 100 that couples to a separate and distinct rotation sensing element. The integrated photonics front-end chip 100 coupled with the rotation sensing element constitute an optical gyroscope module which may be part of an inertial measurement unit (IMU) package. Note that IMU may have other components, such as accelerometers, in addition to the optical gyroscope module. Therefore, making the optical gyroscope module compact reduces the overall size, weight power and cost of the IMU. This weight reduction can be crucial for certain applications, for example, lightweight unmanned aerial vehicles. IMU may be a much-needed technology component for more established sensing technologies for autonomous vehicles, such as LiDAR (Light Detection and Ranging), radar and cameras that will be used in future generation of autonomous vehicles (both terrestrial and aerial).

In the integrated photonics front-end chip 100, low-loss waveguide core may be made of silicon nitride ($Si_3N_4$), and the waveguide cladding may be made of fused silica or oxide. This waveguide structure is also referred to simply as SiN waveguide. Fabrication process for both configurations (i.e. SiN core in fused silica or SiN core in oxide) are described in the U.S. patent application Ser. No. 16/894,120, titled "Single-layer and multi-layer structures for integrated silicon photonics optical gyroscopes," filed Jun. 5, 2020, now U.S. Pat. No. 10,969,548, issued Apr. 6, 2021, and U.S. patent application Ser. No. 17/249,603, titled, "Process flow for fabricating integrated photonics optical gyroscopes," filed Mar. 5, 2021, now U.S. Pat. No. 11,187,532, issued Nov. 30, 2021, both of which are incorporated herein by reference.

In the prior art, as shown in FIG. 1, the waveguide based components on front-end chip 100 may be based on Si or III-V compound semiconductor, or a combination thereof. As unique to this application, and shown later with FIGS. 2-7D, the waveguide based components of the front end chip may be fabricated on a all-SiN platform.

Referring back to FIG. 1, a light source (not shown in FIG. 1, but similar to laser 201 in FIG. 2) is coupled to the integrated photonics front-end chip 100 via a fiber, or may be aligned with lens or may be butt-coupled. The light source can be a semiconductor laser made of III-V compound semiconductor. In case of coupling the laser with a fiber, typically a single-mode (SM) fiber is used. The single mode fiber may be a polarization maintaining fiber (PMF). The core size of a SM fiber is typically in the 8-10 µm range. An input waveguide on the integrated photonics front-end chip 100 may have to be designed with an end shaped to match the mode field diameter (input coupler 102) for efficient coupling with the SM fiber carrying the optical signal from the laser source to the integrated photonics front-end chip. An optical tap (e.g., 0.5-1% or other target amount of optical power) may send part of the optical signal to a detector to measure the coupling efficiency between the laser source and the integrated photonics front-end chip (optical taps are not shown in the figures for simplicity). Optionally, an optical phase modulator may be inserted in the optical path that eventually leads to 2×2 optical splitters 106 and 108. Note that, instead of 2×2 splitters, Y-couplers/Y-splitters or other type of couplers may be used in certain designs, as described with respect to FIG. 2.

The splitters and/or directional couplers are designed on-chip to guide light coming back from the sensing element (such as the fiber coil 205 shown in FIG. 2) into the detector 138. Detector 138 may be referred to as Sagnac detector—this is the key detector in the integrated photonics front-end chip 100 for phase measurement. The detector 138 may have to be isolated by implant around it (not shown) to block stray light. Implants are high dose of dopants. In addition to the Sagnac detector 138, additional detectors 136 and 137 may be incorporated to measure (for testing and/or monitoring) propagation and coupling losses at various places along the integrated photonics front-end chip 100 as well as to measure coupling efficiency between the integrated photonics front-end chip and the rotation sensing element. The detectors can be PIN or avalanche photodiodes that convert light to electrical signal. The material for the detectors can be silicon, germanium, silicon germanium or other compound semiconductors (such as indium phosphide (InP), gallium arsenide (GaAs) or other III-V semiconductors). Note that implant regions may be created around other waveguide-based components (in addition to the Sagnac detector), such as the splitters, couplers etc. to minimize stray light bouncing around in the chip.

Phase modulators may be incorporated in one or both of the two output branches of the waveguide leading to output couplers 132a and 132b that are optimized for coupling out to the SiN waveguide based sensing chip with a sensing coil/ring resonator. In the non-limiting embodiment shown in FIG. 1, there are phase modulators/phase shifters 120 and 122 on both the output branches. Each branch may have both a high-speed modulator (120a and 122a) and a thermal modulator (120b and 122b), or just a high-speed modulator, or just a thermal modulator. Also, in some embodiments, only one branch may have phase modulator (high-speed, thermal, or a combination of high-speed and thermal), while the other branch does not have any phase modulator. In addition, mode-selective filters (such as TM filters which filters out most of the transverse-magnetic (TM) mode while passing transverse-electric (TE) mode) may be placed at various locations (e.g., 160, 162, 164 and 166) along the path of the optical beam. TM filters may be placed in multiple stages to improve extinction ratio between the TE and TM modes. Details of mode-selective filters and waveguide structures are covered in provisional application 62/904,443 filed on Sep. 23, 2019, titled, "System Architecture for Silicon Photonics Optical Gyroscopes with Mode-Selective Waveguides," which was converted to non-provisional application Ser. No. 16/659,424, entitled, "System Architecture for Integrated Photonics Optical Gyroscopes," filed Oct. 21, 2019, which is now issued as U.S. Pat. No. 10,731,988 on Aug. 4, 2020.

Figure 2:
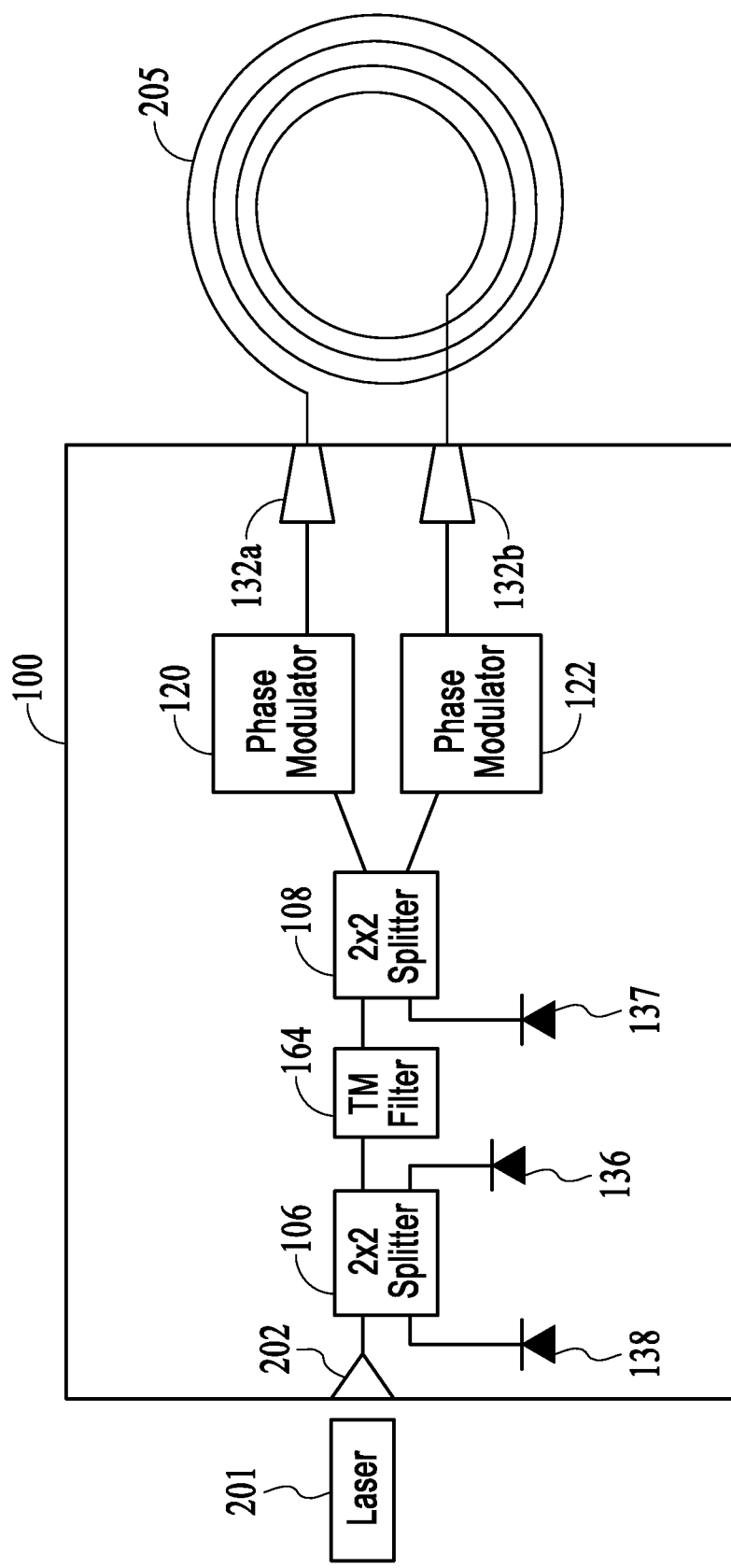
FIG. 2 is a simplified schematic of an optical gyroscope where an off-chip laser is coupled to an integrated photonics front-end chip, which in turn couples to a rotation sensing element, according to an embodiment of the present disclosure.

FIG. 2 is a simplified schematic of an optical gyroscope where an off-chip laser 201 is coupled to an integrated photonics front end chip 100 via input coupler 202 (which could be a fiber coupler like 102, or could be optimized for butt-coupling or coupling via a lens). The front-end chip 100 couples to a rotation sensing element (such as a fiber coil 205), according to an embodiment of the present disclosure. Note that for simplicity, some components of front-end chip 100 that are shown in FIG. 1 are not shown in FIG. 2. The TM filter 164 is a key component in this design. And the elements 106 and 108 may be y-couplers, Y-splitters or directional couplers or multi-mode interference (MMI) devices acting as splitters/couplers. Note that a configuration where the rotation sensing element is also made of a SiN waveguide coil or microresonator ring has been disclosed in co-owned U.S. Pat. No. 11,131,545, issued Sep. 28, 2021, titled, "Multi-layer Silicon Nitride Waveguide Based Integrated Photonics Optical Gyroscope." In this application, the rotation sensing element is a fiber coil instead of a waveguide coil.

Figure 3:
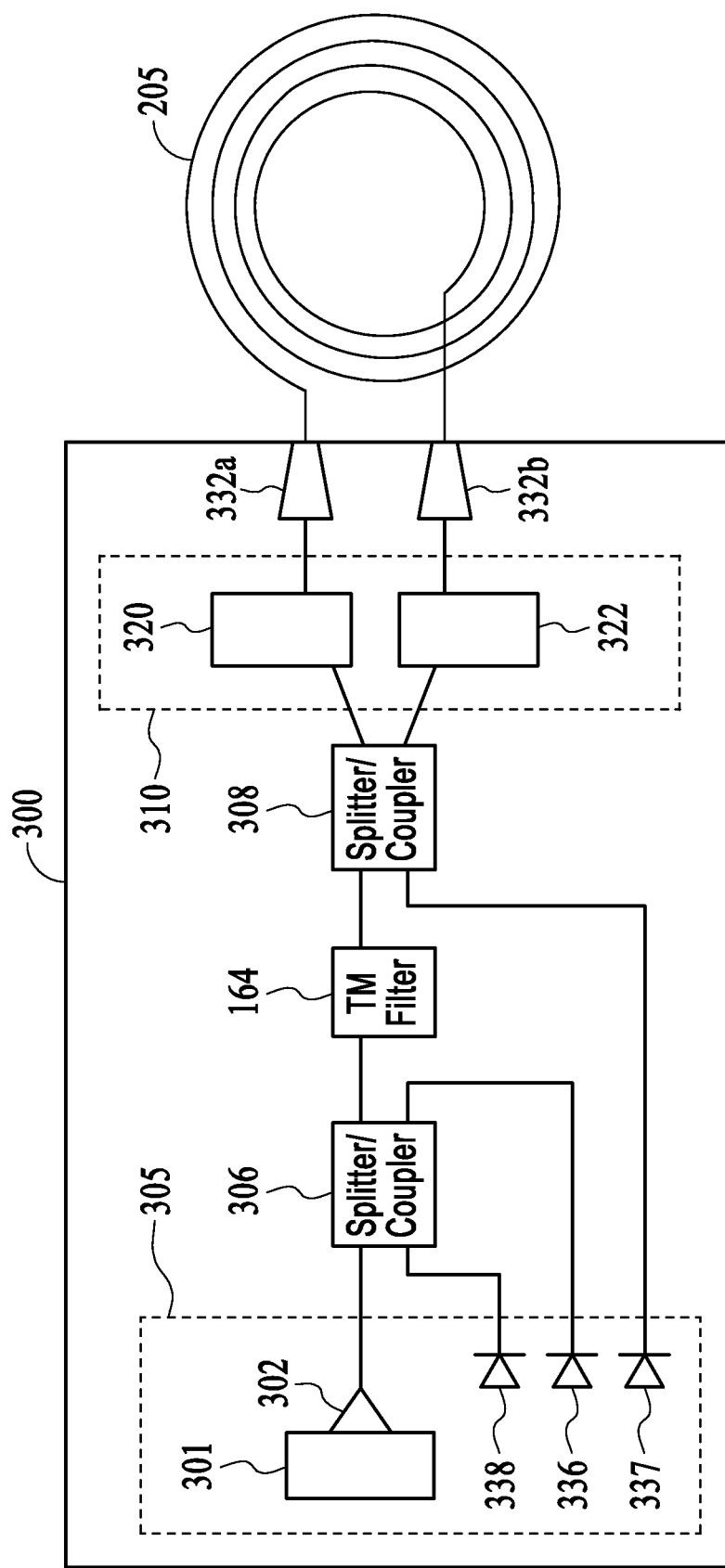
FIG. 3 is a simplified schematic of an optical gyroscope where a laser is hybridly integrated to an integrated photonics front-end chip, according to an embodiment of the present disclosure.
Figure 4:
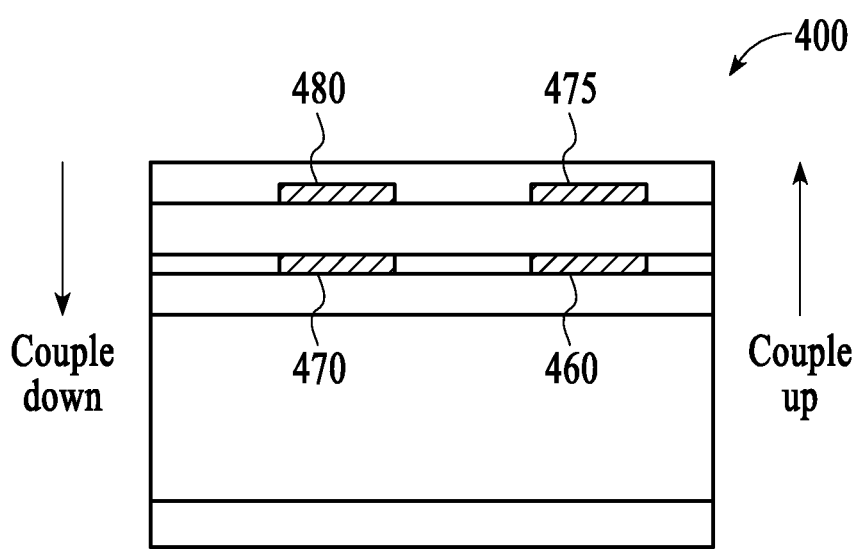
FIG. 4 schematically illustrates a longitudinal cross-sectional view (i.e. side view) of a multi-layer silicon nitride waveguide based integrated photonics front-end chip, according to an embodiment of the present disclosure.

FIG. 3 shows that laser may also be on-chip, i.e. integrated onto front-end chip via wafer bonding, flip-chip bonding or other hybrid integration approach, such as selective growing of laser material that is different from the platform material of the front-end chip 300. In the embodiment of FIG. 3, the platform material for the front-end chip 300 is SiN. All the waveguide-based optical components on the front-end chip 300, i.e. input coupler 302, splitter/couplers 306 and 308, output couplers 332a and 332b and the waveguide portions connecting these various optical components are made of SiN, with the exception of the laser 301, detectors 338, 336 and 337 and the phase modulators 320 and 322. The detector 338 is the sagnac detector (equivalent to 138), and the other detectors 336 and 337 are equivalent to detectors 136 and 137. The dotted outlines 305 and 310 indicates layers of different materials that are selectively grown on the SiN platform or bonded to the SiN platform.

A non-limiting illustrative dimension of the SiN waveguide in front-end chip 300 is a height (i.e. thickness of the patterned waveguide core layer) of 90 nm and a lateral width of 2.8μμm. Persons skilled in the art would appreciate that these illustrative dimensional values mentioned in the specification are not limiting to the scope of the disclosure. To lower waveguide loss, it may be beneficial to have symmetric upper and lower claddings around the SiN core. This structure may be obtained via wafer bonding of fused silica wafers or other suitable materials like oxide. The thickness of the waveguide SiN layer may vary between 60-100 nm and the width may vary between 2-5 μm depending on the desired optical mode.

The present inventors recognize that distributing the SiN waveguide based optical components, such as the optical splitters, directional couplers, input or output couplers and mode-selective filters, into different layers (e.g., two or more layers) could lead to better performance without increasing the form factor. As shown in the cross section of the SiN chip 400 in FIG. 4, multi-layer design requires the light coupled at the input waveguide 460 in the bottom layer to couple up from the bottom layer to the top layer and then again couple down from the top layer to the bottom layer to be coupled out at the output waveguide 470. Specifically, light couples up from input waveguide 460 in the bottom layer to top layer waveguide 475, and from top layer waveguide 480 to output waveguide 470 in the bottom layer. Note that the multi-layer configuration can be achieved via die stacking or via growth and processing of materials in multiple layers. Though most of the figures illustrate just one SiN layer, the SiN layer can have vertically stacked sub-layers between which light can evanescently coupled. Multi-layer SiN based waveguide components have been disclosed in U.S. Pat. No. 11,131,545, issued Sep. 28, 2021, titled, "Multi-layer Silicon Nitride Waveguide Based Integrated Photonics Optical Gyroscope."

Figure 5A:
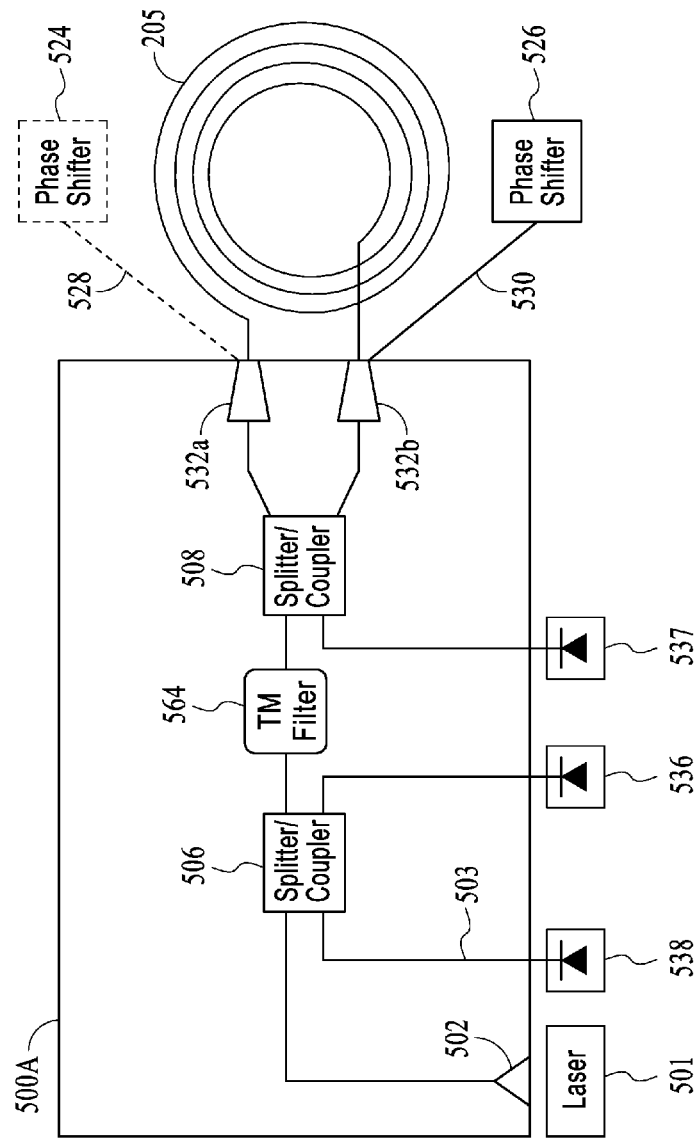
FIG. 5A schematically illustrates distribution of silicon nitride waveguide components, including a mode-selective filter, in a single layer of an integrated photonics front-end chip, according to an embodiment of the present disclosure.
Figure 5B:
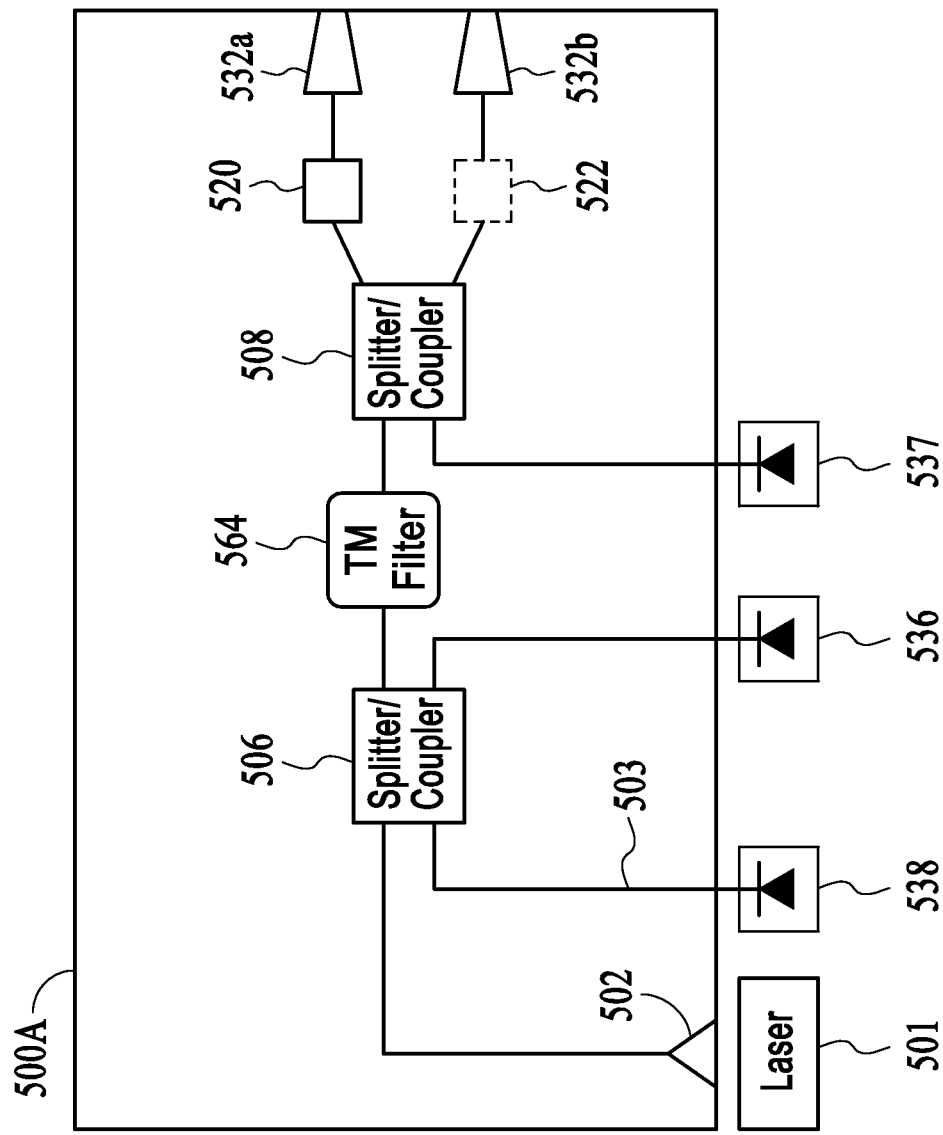
FIG. 5B schematically illustrates phase shifter(s) integrated with the front-end chip of FIG. 5A, according to an embodiment of the present disclosure.

FIGS. 5A and 5B schematically illustrate distribution of silicon nitride waveguide components in one or more layers in a SiN front-end chip 500A. Simply put, all the integrated photonics waveguide based optical components that are typically in a front-end chip and the sensing element (e.g., fiber coil 205) is outside of the front-end chip. Since the laser 501 and detectors 536, 537 and 538 are fabricated using a different material system (i.e. not SiN), those would be the only components that would be outside of the SiN die. Laser 501, input coupler 502, splitters 506 and 508, output couplers 532a and 532b, and detectors 536, 537, 538 are functionally equivalent to elements 201, 202, 106, 108, 132a, 132b, 136, 137 and 138 shown in FIG. 2. TM filter 564, made of SiN waveguide, is functionally equivalent to the TM filter 164 in FIG. 1. Also, input and output couplers 532a and 532b may be assisting with mode matching with the external sensing element (e.g., fiber coil 205) along the propagation direction. FIG. 5A shows a configuration of the front-end chip without an on-chip phase shifter. In this embodiment, the phase shifter is made in the form of an external chip or device and coupled to the output waveguide branch(es) of the front-end chip. At least one external phase shifter (such as phase shifter 526) is coupled to the front-end chip 500A. In some embodiments, two external phase shifters, 526 and 524 may be coupled to two output couplers 532b and 532a respectively, though phase shifter 524 is optional (and hence shown with dashed line). External phase shifters 526 and 524 may be coupled to the front-end chip 500A using connecting fibers 530 and 528 respectively to implement fiber-coupled external phase shifters.

FIG. 5B shows that a phase shifter 520 is integrated with an output branch of the waveguide that is coupled to one end of the sensing element (nor shown here). Note that optionally there may be an additional phase shifter 522 integrated with the other output branch of the waveguide coupled to the other end of the sensing element too. The phase shifter(s) may be a metal heater (thermal phase shifter) or a piezo-based or electro-optic-based materials. Lithium niobate is a commonly used electro-optic material, but other electro-optic polymers/ceramics exist too. Lithium niobate or other polymers/ceramics may be deposited as a film (e.g., thin film) or bonded on the top SiN layer. Having the phase shifter built on top of the SiN layer lends itself well to the deposition/bonding process. Examples of piezo-electric material include lead zirconate titanate (PZT). Other phase shifter materials suitable for integration with SiN waveguides include aluminum nitride (AlN), indium phosphide (InP), stronsium bismuth titanate (SBT) etc. Note that discrete optical devices with phase shifting material can also be fiber-coupled to the SiN waveguide platform. For example a PZT disc can be fiber-coupled with the SiN waveguide platform or a lithium niobate modulator can be fiber-coupled to the SiN waveguide platform.

Integration of phase shifters can also be accomplished through wafer bonding of a III-V wafer or even silicon photonics wafer with the SiN front-end chip. The phase shifter may be deposited/bonded/grown on the III-V wafer or silicon photonics wafer, which is then wafer bonded/flip-chip bonded to the SiN front-end chip. The phase shifters, though made of a material other than SiN, can be accessed (for electronic signal injection) from the top. In some embodiments, the electrodes for current injection to the phase shifters can be routed on the SiN front-end chip.

Figure 6:
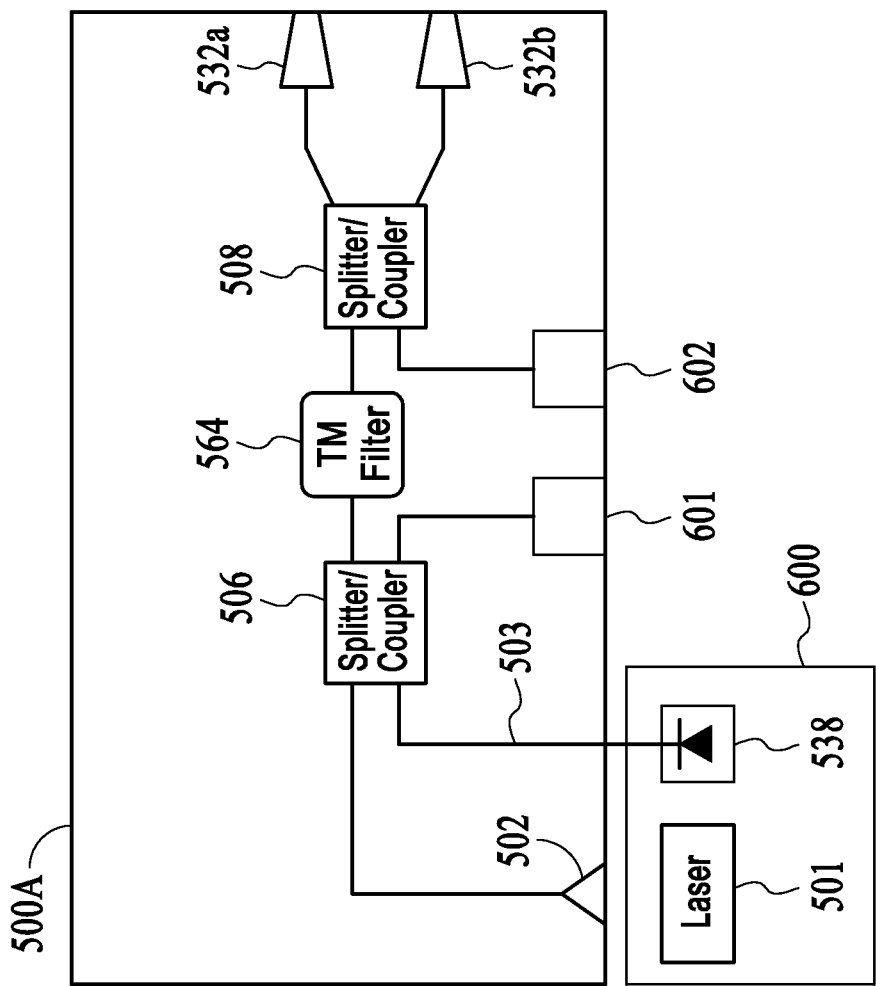
FIG. 6 schematically illustrates distribution of silicon nitride waveguide components in a first layer of front-end chip, according to another embodiment of the present disclosure, where a laser and a Sagnac detector are housed on a common substrate for self-aligned coupling with the integrated photonics components in the first layer of the front-end chip.

Note that since the laser 501 and the detectors may be on-chip or may be in a separate chip that is outside of the SiN chip, they need to be aligned with the corresponding waveguide components on the SiN layer 500A. FIG. 6 shows the laser and the Sagnac detector 538 may be supported by the same substrate in module 600 which is then aligned to the layer 500A of the SiN die. The physical separation between the laser 501 and the detector 538 should match the physical separation of the waveguides on the SiN layer 500A. When the laser is aligned with the input coupler 502, the detector is automatically aligned to the directional coupler 503 without having to separately align the laser and the Sagnac detector. This design also automatically isolates the Sagnac detector from unwanted stray light that may leak into the substrate of layer 500A.

FIG. 6 also shows that in some embodiments instead of having detectors 536 and 537, the waveguide ends may lead to implant regions 601 and 602 to absorb light. Note that implant regions may be created around other waveguide-based integrated photonics components (e.g., splitters, couplers etc.) to minimize stray light bouncing around in the chip. Stray light can come from the waveguide components (splitters/couplers etc.) or from other layers. Examples of implants around waveguide-based integrated photonics components are described in co-owned patent application Ser. No. 16/659,424, entitled, "System Architecture for Integrated Photonics Optical Gyroscopes," filed Oct. 21, 2019, which is now issued as U.S. Pat. No. 10,731,988.

In some embodiments, to accomplish hybrid integration of different materials with the SiN platform, a separate chip with the phase shifter can be inserted into a cavity etched within the SiN waveguide platform for automatic alignment of the phase shifter with the SiN waveguides. Similarly, a separate chip with the lasers and the detectors can also be inserted into an etched cavity within the SiN waveguide platform.

In some embodiments, all components that are not made of SiN are fabricated on a single external chip that is hybridly integrated/coupled and aligned with the waveguides on the SiN platform. For example, the lasers, detectors and phase shifters can all be on a single external chip and attached or bonded to the SiN.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. An optical gyroscope comprising:
  a front-end chip fabricated on a silicon nitride (SiN) waveguide platform, wherein the front-end chip launches light into and receives light from a rotation sensing element, and wherein the front-end chip comprises SiN waveguide-based optical components that guide the light towards and from the rotation sensing element;
  a fiber-optic coil coupled to the front-end chip, wherein the fiber-optic coil acts as the rotation sensing element; and
  at least one external phase shifter coupled to the front-end chip, wherein the at least one external phase shifter is physically outside of the SiN waveguide platform.

2. The optical gyroscope of claim 1, wherein the SiN waveguide-based optical components include one or more from: optical splitters, directional couplers, input couplers, output couplers, and mode-selective filters.

3. The optical gyroscope of claim 1, wherein a semiconductor light source is hybridly integrated or coupled with the SiN waveguide platform.

4. The optical gyroscope of claim 3, wherein one or more photodetectors are hybridly integrated or coupled with the SiN waveguide platform.

5. The optical gyroscope of claim 4, where the semiconductor light source and the one or more photodetectors are integrated on a common substrate which is then coupled to the SiN waveguide platform of the front-end chip.

6. The optical gyroscope of claim 5, wherein the common substrate is wafer-bonded or flip-chip bonded with the front-end chip.

7. The optical gyroscope of claim 5, wherein the common substrate is self-aligned and coupled with the front-end chip.

8. The optical gyroscope of claim 4, wherein the one or more photodetectors are bonded or selectively grown on the SiN platform of the front-end chip.

9. The optical gyroscope of claim 3, wherein the semiconductor light source is selectively grown on the SiN platform of the front-end chip.

10. The optical gyroscope of claim 1, wherein the SiN waveguide-based optical components include a first and a second output waveguide branches, wherein the first output waveguide branch is coupled to a first end of the fiber-optic coil and the second output waveguide branch is coupled to a second end of the fiber-optic coil.

11. The optical gyroscope of claim 10, wherein the at least one external phase shifter is coupled with the first or the second output waveguide branches.

12. The optical gyroscope of claim 11, wherein the at least one external phase shifter is implemented on a separate device made of a material different from SiN that is fiber-coupled to the SiN waveguide platform.

13. The optical gyroscope of claim 12, wherein the at least one external phase shifter is implemented by depositing or bonding an electro-optic material on the separate device.

14. The optical gyroscope of claim 13, wherein the electro-optic material is lithium niobate or polymer.

15. The optical gyroscope of claim 13, wherein the at least one external phase shifter comprises a thin film of an electro-optic material.

16. The optical gyroscope of claim 12, wherein the at least one external phase shifter is implemented by depositing or bonding a piezo-electric material on the separate device.

17. The optical gyroscope of claim 16, wherein the piezo-electric material is aluminum nitride (AlN), strontium bismuth titanate (SBT) or lead zirconate titanate (PZT).

18. The optical gyroscope of claim 12, wherein the SiN waveguide platform has an additional on-chip thermal phase shifter fabricated by depositing or bonding a film of metal acting as a heater.

19. An optical gyroscope comprising:
- a front-end chip fabricated on a silicon nitride (SiN) waveguide platform, wherein the front-end chip launches light into and receives light from a rotation sensing element, and wherein the front-end chip comprises SiN waveguide-based optical components that guide the light towards and from the rotation sensing element, wherein the SiN waveguide-based optical components include one or more optical splitters, directional couplers, input couplers, output couplers, and mode-selective filters;
- a fiber-optic coil coupled to the front-end chip through the output couplers, wherein the fiber-optic coil acts as the rotation sensing element; and
- at least one external phase shifter coupled to front-end chip, wherein the at least one external phase shifter is physically outside of the SiN waveguide platform.

20. The optical gyroscope of claim 19, wherein a semiconductor light source is hybridly integrated or coupled with the SiN waveguide platform.

21. The optical gyroscope of claim 19, wherein the SiN waveguide-based optical components are distributed among multiple vertical layers of SiN that are evanescently coupled with each other.

22. The optical gyroscope of claim 19, wherein the at least one external phase shifter is fabricated on a separate device that is fiber-coupled with the SiN platform.

23. The optical gyroscope of claim 19, wherein the optical splitters are 2×2 splitters or MMI-based devices.

24. The optical gyroscope of claim 19, wherein the mode-selective filter filters out transverse magnetic (TM) mode.

25. The optical gyroscope of claim 19, wherein the at least one external phase shifter is an electro-optic phase shifter.

26. The optical gyroscope of claim 25, wherein a material of the at least one external phase shifter is lithium niobate or electro-optic polymer.

27. The optical gyroscope of claim 19, wherein the at least one external phase shifter is a piezo-electric phase shifter.

28. The optical gyroscope of claim 27, wherein a material of the at least one external phase shifter is aluminum nitride (AlN), strontium bismuth titanate (SBT) or lead zirconate titanate (PZT).

* * * * *

UNITED STATES PATENT AND TRADEMARK OFFICE
CERTIFICATE OF CORRECTION

| | |
|---|---|
| PATENT NO. | : 11,656,080 B1 |
| APPLICATION NO. | : 17/894108 |
| DATED | : May 23, 2023 |
| INVENTOR(S) | : Mario Paniccia and Mike Horton |

It is certified that error appears in the above-identified patent and that said Letters Patent is hereby corrected as shown below:

In the Claims

In Claim 23, Column 10, Line 12:
Delete "2·2"
Insert --2x2--

Signed and Sealed this
Thirtieth Day of January, 2024

Katherine Kelly Vidal
*Director of the United States Patent and Trademark Office*